Oct. 16, 1934.   H. H. McKEE ET AL   1,976,855
SPACING CONVEYER
Original Filed Aug. 3, 1931   3 Sheets-Sheet 3

Harry H. McKee
Nickolas Dziedzic
INVENTORS

Patented Oct. 16, 1934

1,976,855

UNITED STATES PATENT OFFICE 1,976,855

SPACING CONVEYER

Harry H. McKee and Nicholas Dziedzic, Chicago, Ill., assignors to Industrial Patents Corporation, Chicago, Ill., a corporation of Delaware Original application August 3, 1931, Serial No. 554,628. Divided and this application November 14, 1932, Serial No. 642,580

14 Claims. (Cl. 198—34)

This invention relates to conveyer means especially adapted for use in combination with a slicing machine and being particularly designed to deliver groups of slices in condition for wrapping in suitable packages for ready distribution.

This application is a divisional case of our application entitled Slicing machine, Serial No. 554,628, filed August 3, 1931.

An object of the invention is to provide a novel conveying means in a meat cutting machine adapted to cooperate with a knife element thereof for delivery of groups of slices of meat at intervals for packaging.

This conveyer means includes automatically operated transfer means adapted to raise or elevate groups of slices at intervals from a portion of the conveyer and rapidly transfer the groups as units to another portion of the conveyer and away from the knife element.

Another object of the invention is to provide a novel means in a meat cutting machine which includes slow moving conveying elements adapted to receive slices severed from a body of meat by a knife element, and fast moving conveyer elements, means being provided for transferring groups of slices from the slow moving conveyer elements to the fast moving conveyer elements at intervals.

A further object of the invention is to provide a spaced conveyer which is adapted for use with a slicing machine, the spaced conveyer comprising slow moving conveyer elements adapted to receive slices severed from a body of meat, which slices have been compacted by a compacting element operable with the knife element of the machine, and fast moving conveyer elements, transfer means being provided for transferring the compacted slices from the slow moving conveyer elements to the fast moving conveyer elements, this transfer means being provided with means whereby disengagement of the compacted slices is prevented during their transfer.

Other objects of the invention will be apparent from the description and claims which follow.

In the drawings, the slicing machine shown is the one more particularly described and claimed in our application entitled Slicing machine, Serial No. 554,628, filed August 3, 1931, of which this application is a division.

Referring now to the drawings.

Figure 1:
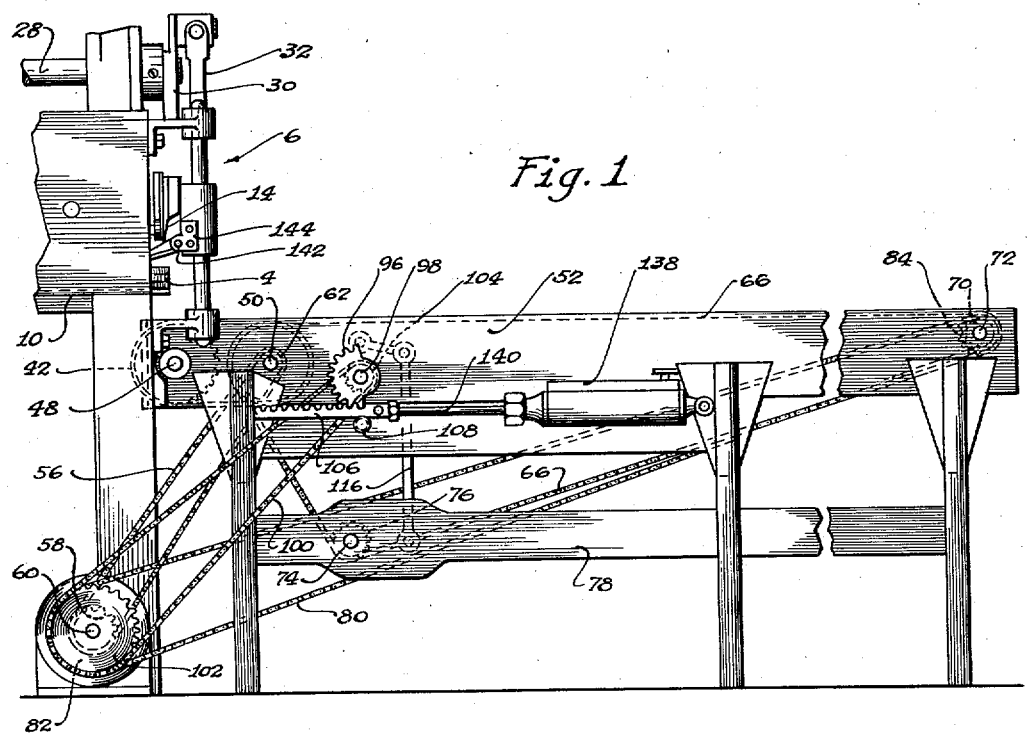
Figure 1 is a fragmentary view in end elevation of an embodiment of the present invention as used in combination with a slicing machine.

Referring now more in detail to the drawings, an embodiment selected to illustrate the present invention is disclosed as comprising a main conveyer section 2 adapted to convey pieces of meat 4 into a cutting mechanism 6 positioned at the forward end thereof and which is adapted to sever slices from these pieces of meat and cause the same to be discharged onto an auxiliary conveying section 8 which is adapted to convey groups or sets of these slices in a uniform arrangement to a place where the same may be readily and easily lifted therefrom and suitably wrapped for shipment.

In the present illustrative embodiment, the pieces of meat 4 are disclosed as being pieces of bacon which have been derind and properly treated, as by being smoked and the like. These pieces of bacon 4 are introduced into the main conveyer section 2 and at the rear end thereof between conveying elements 10 and 12, which cause the same to have a uniform progressive movement toward the front thereof.

The knife mechanism 6 is positioned at the front end of the main conveyer section 2 and comprises an elongated knife element 14 extending across substantially the entire distance of the open forward end of the main conveyer section 2. This knife element 14 is provided with guide screws or bolts 16 threaded therein, which are operable within guide slots 18 and 20 provided in a cross-head 22 having hubs 24 slidably mounted on the vertical guide posts 26 suitably secured by any means at the sides of the main conveyer section 2. Reciprocating movement of the cross-head 22, as likewise the knife element 14 carried thereby, is effected by means of a horizontally disposed drive shaft 28 mounted on the top of the main conveyer section 2 and suitably operated by a motor or the like (not disclosed). This drive shaft 28 is provided with a crank arm 30 mounted on the forward end thereof for reciprocating a rod 32 connected thereto and to the cross-head 22.

This drive mechanism causes the knife element 14 to have reciprocating movement in a substantially vertical plane, and although such movement would effectively sever slices from the pieces of bacon 4, the invention further contemplates the idea of giving the knife element 14 reciprocating movement in a lateral direction within this substantially vertical plane, in order to simulate the cutting movement of a knife and to provide slices having well defined surfaces free from shreds and loose particles of meat. This reciprocating movement in a lateral direction is effected by means of rolls 34 mounted upon the main conveyer section and in spaced relation for receiving a fin or other projecting element 36 of the knife element 14 therebetween, this projecting element 36 being angularly disposed whereby the knife element 14 is given a reciprocating lateral movement during the travel of this projecting element between the rolls 34.

It will be noted by reference to the drawings that means are provided, adapted to cooperate with the knife mechanism 6 for depositing groups of slices of meat upon the conveyer section 8 in uniformly spaced and overlapped relation, whereby these groups may be immediately wrapped for shipment in this uniformly arranged condition. Such means comprises a knife guard or wedge 38 suitably secured, as by means of the screws 40, to the cross-head 22 and on the front face of the knife element 14. This knife guard or wedge is angularly disposed in such a position as to follow the slices as the same are severed from the piece of bacon 4 and to cause the same to fall onto the conveyer 8 in the position clearly disclosed in Figure 3 of the drawings.

The conveyer section 8 includes not only means for conveying the several slices of bacon to a point for wrapping, but further includes means whereby a certain number of slices of bacon, approximating a given unit of weight, may be delivered at intervals of time to the point where the same are wrapped. In order to effect this result, the conveyer section 8 comprises a plurality of slow moving conveyer elements 42 suitably mounted for movement upon sprockets 44 and 46, which in turn are mounted upon the tranverse shafts 48 and 50, respectively, mounted for rotation in the side frame members 52 of the conveyer frame 54. These conveyer elements 42 are moved at a suitable rate of speed by means of a drive element 56 passing over a sprocket 58 on a main drive shaft 60, this drive element 56 passing around another sprocket 62 mounted on the end of the shaft 50. The sprockets 46 and 52 are fixed to the shaft 50.

Groups of the severed slices are transferred at intervals from the slow moving conveyer elements 42 by a transfer means, generally designated as 64 and to be hereinafter more fully disclosed, to relatively fast moving conveyer elements 66. In the present illustrative embodiment, the ratio between the rates of travel of the elements 66 to the elements 42 is 2 to 1, although it is to be understood that the same may be varied within the scope of the invention. The conveyer elements 66 pass over sprockets 68 rotatively mounted upon the shaft 50 and over driving sprockets 70 secured to a shaft 72 mounted in the side frames 52 and at their forward end, and over idling sprockets 74 secured on a shaft 76 mounted in a lower frame member 78 of the conveyer section. The drive sprockets 70 are driven by means of a drive element 80 passing around a sprocket 82 secured to the main drive shaft 60 and a sprocket 84 mounted on the end of the shaft 72.

Figure 2:
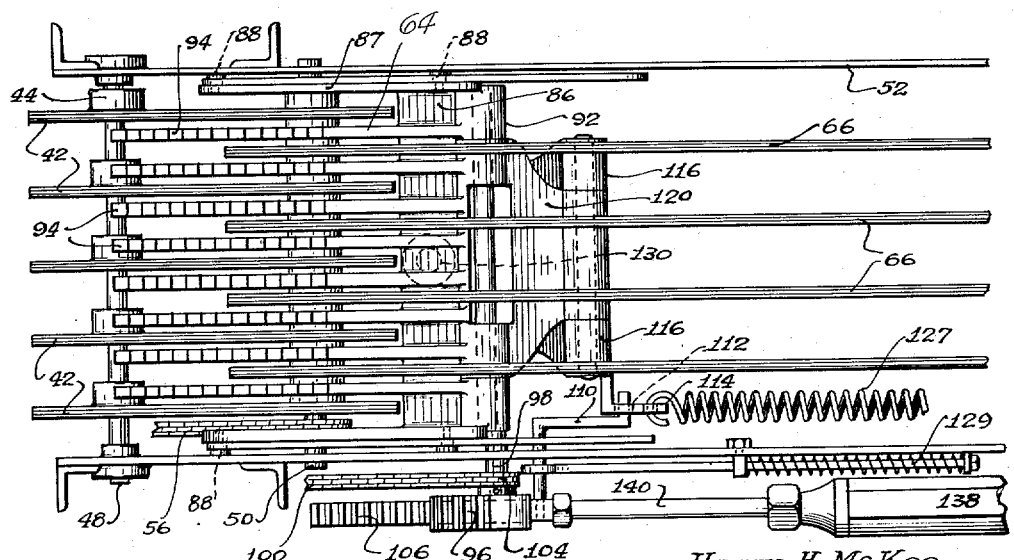
Figure 2 is an enlarged fragmentary top plan view of a portion of the embodiment disclosed in Figure 1 of the drawings.

The transfer means 64 comprises a transfer platform 84 having a body portion 86 substantially U-shaped in cross-section provided with the arms 87 having lugs or roller units 88 projecting laterally therefrom and guided in the elongated slots 90 of a platform support 92. The slots 90 are open at the top so as to allow the raising of the transfer platform 84. The transfer platform 84 is normally positioned below the conveying surfaces of the conveyer elements 42 and 66 and is provided with a plurality of serrated arms 94 disposed between the conveying elements 42 and 66, as clearly shown in Figure 2 of the drawings. In order to transfer groups of slices from the slow moving conveyer elements 42 to the fast moving conveying elements 66, the transfer platform 84 is raised so that the serrated portions of the arms 94 engage with a group immediately below the knife mechanism 6 to lift this group from the elements 42 and to transfer the same to the elements 66, after which, the platform 84 is moved again below these conveying elements.

The movement of translation of the platform 84 substantially parallel to the conveying elements 42 and 66 is effected through the medium of a mutilated gear 96 mounted upon a shaft 98 journaled in the frame members 52, this shaft being driven by means of a drive element 100 driven by a sprocket 102 mounted upon the shaft 60 and passing around a sprocket 104 mounted at the end of the shaft 98. This mutilated gear is driven at the proper speed and is provided with teeth meshing with the teeth on a rack 106 movable over a roll 108 mounted on one of the side frames 52, this rack having a Z-shaped rod 110 secured thereto which projects inwardly of the frame 52 and engages in a slot 112 of a lug 114 integral with an oscillating rod 116 secured, as by means of a bolt, rod, or the like 118, to the frame 78, this rod 116 being connected to the transfer platform 84 through the medium of a link member 120.

Figure 3:
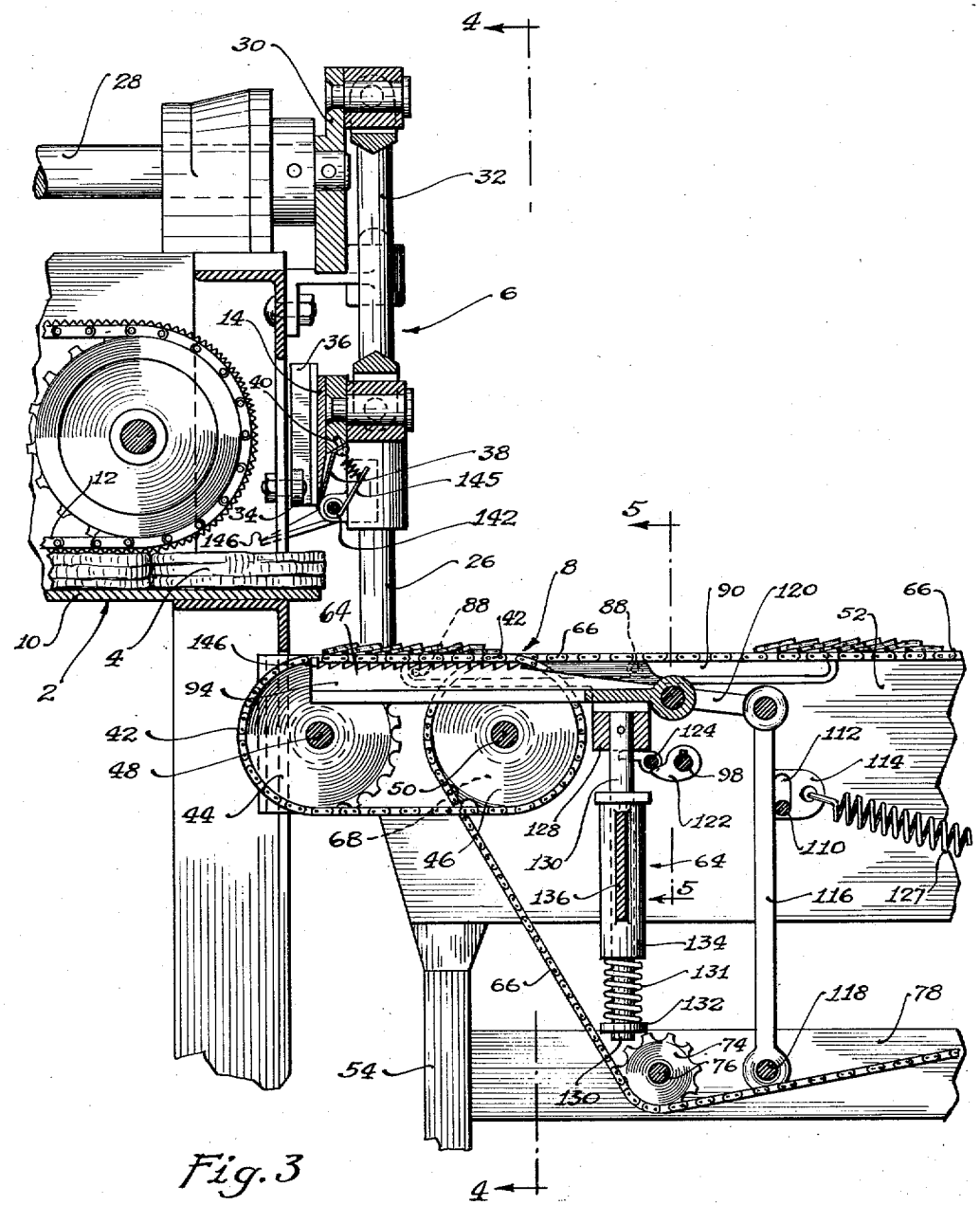
Figure 3 is a fragmentary view in vertical cross-section of the embodiment disclosed in Figure 1 of the drawings.
Figure 4:
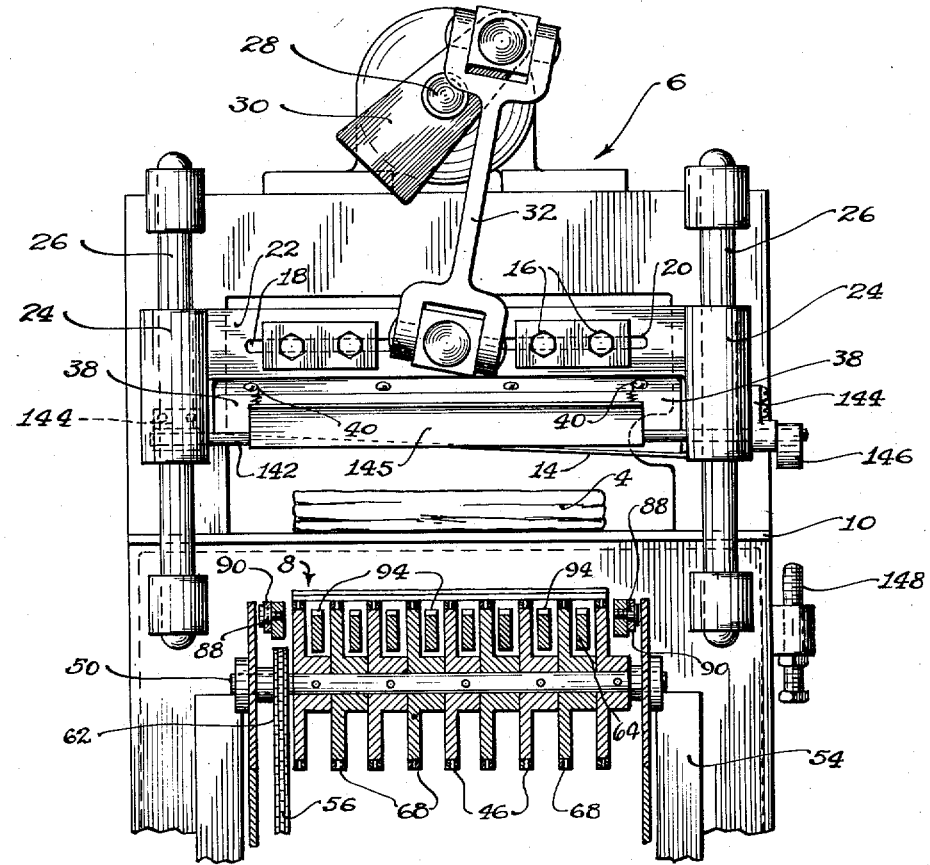
Figure 4 is a fragmentary view partly in cross-section and partly in end elevation and taken in the planes represented by line 4—4 of Figure 3 of the drawings.
Figure 5:
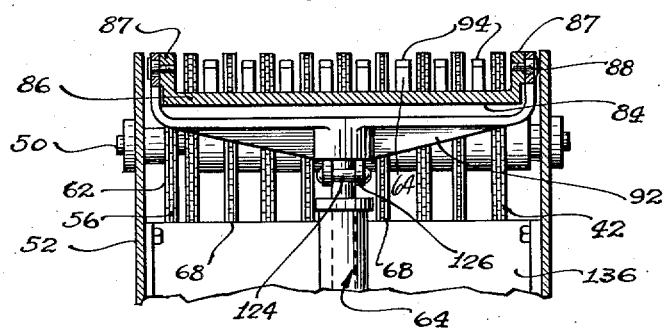
Figure 5 is a fragmentary view in vertical cross-section taken in the plane represented by line 5—5 of Figure 3 of the drawings.

It will be quite apparent from the drawings, that when the teeth of the gear 96 engage with the teeth on the rack 106 and the gear 96 continues to rotate, the platform 84 is moved from its most forward position into the position as shown in Figure 3 of the drawings, and immediately below the group of slices on the conveyer elements 42 beneath the slicing mechanism 6. At this particular interval, the lug 122, which is mounted upon the shaft 98, engages a rod 124 secured in a bracket 126 connected to the hub 128 of the platform support 92 for lifting this platform, as likewise the platform itself, whereby the serrated arms 94 lift the group of slices thereabove from the conveying elements 42. The platform 84 is maintained in this raised position by the cam surface of the lug 122.

Just as the transfer platform 84 is raised through the medium of the lug 122, the teeth of the gear 96 become disengaged from the teeth of the rack 106, and under the influence of the coil springs 127 and 129, the transfer platform 84 is caused to be moved forwardly over the conveying elements 66 at a rather rapid and quick speed. The transfer platform 84 moves forwardly at a greater speed than that of the slow moving conveyer elements to transfer the material from the slow moving conveyer elements to the fast moving conveyer elements to space the material on the latter. Toward the end of this forward movement, the platform 84 is lowered due to the contour of the cam surface on the lug 122, whereby the group of transferred slices is lowered onto the conveying element 66, and the arms 94 of the platform are again lowered below these conveying elements.

The lowering of the platform support 92 is effected through the medium of a coil spring 131, fitting around the end of a rod 130 mounted in the hub 128, this spring abutting against an end shoulder 132 thereof and the lower end of the tubular member 134 slidably supporting the rod 130 which is held in position by means of the transverse webs 136 secured to the side frame members 52 in any suitable manner. The transfer platform 84 is slidably mounted upon a vertically movable platform support formed by the hub 128 and the vertically slidable rod 130.

The forward movement of the platform 84 is cushioned by means of an air cylinder 138 having a piston 140 integral with the rack 106, whereby the rapid forward movement of the platform 84 is gradually decreased toward its most forward position.

Adjacent the forward face of the knife element 14 and knife guard 38 is a transverse shaft 142 mounted in the brackets 144 secured to the hubs 24 of the cross-head 22, the shaft 142 having an elongated rectangular plate 145 secured thereto which is provided with a latch or projecting member 146 adapted to contact with an adjustable set screw 148, mounted on the main frame of the conveyer section 2, upon movement of the cross-head 22 into its lowermost position, whereby the plate 145 is moved into contacting engagement with the slices upon the conveyer element 42 and for compressing and compacting the same thereon to prevent their disengagement one from the other and the disturbing of their uniform arrangement. The arms 94 are provided with an upstanding projection 146 adapted also to prevent disengagement of the slices during their movement from conveyer elements 42 to the conveyer elements 66.

While we have herein described and upon the drawings shown an illustrated embodiment of the invention, it is to be understood that the invention is not limited thereto but may comprehend other constructions, arrangements of parts, details and features without departing from the spirit thereof.

Having thus disclosed the invention, we claim:

1. A conveyer mechanism comprising a slow moving conveyer element, a fast moving conveyer element and means comprising transfer elements for simultaneously raising from the slow moving conveyer a group of material that is being carried by said slow moving element and for transferring the group thus raised forwardly and quickly to a position over the fast moving conveyer element and for then depositing the group thus transferred to and upon said fast moving conveyer element, after which there is a slow return of the transfer elements.

2. A conveyer mechanism comprising slow longitudinally moving conveyer elements, fast longitudinally moving conveyer elements, transfer means for lifting material being transferred by the slow conveyer elements and for quickly transferring the material thus lifted from the slow moving conveyer elements longitudinally in a forward direction to and over the fast moving conveyer elements, and operating means for imparting the desired longitudinal movements to said transfer means, said transfer means having transfer members constituting part thereof which are normally located below the conveying surface of said conveyer elements and also having means associated with the operating means for the transfer mechanism for periodically raising the transfer members which are normally below the conveying surface of said conveyer elements so as to lift from the slow moving conveyer element material thereupon preparatory to the forward quick transfer of the material thus lifted and for the lowering of members thus lifted when the material has been transferred to and over said fast moving conveyer elements.

3. A conveyer mechanism comprising slow moving spaced conveyer elements, fast moving spaced conveyer elements, which said conveyer elements are arranged with the fast moving conveyor elements longitudinally ahead of the slow moving conveyer elements, a longitudinally movable transfer platform having arms operable within the spaces of said elements for raising material from said slow moving conveyer element and for lowering material to and upon the fast moving conveyer elements, and means for imparting quick forward longitudinal movement to said transfer platform when said arms are lifted for effecting a transfer of material from the slow moving spaced conveyer elements to the fast moving spaced conveyer elements and for effecting a slow rearward longitudinal return movement when said arms are in the lower position therefor.

4. A spaced conveyer mechanism comprising a set of continuously driven slow moving spaced conveyer elements, a set of continuously driven fast moving spaced conveyer elements, a movable transfer platform having arms operable within the spaces of said elements for raising material from said slow moving conveyer elements for transferring material from over the slow moving conveyer elements to position over the fast moving conveyer elements for lowering the material to and upon the fast moving conveyer element and for returning to position below the top of the slow moving conveyer elements preparatory to a repeated cyclic movement, and means for moving said movable transfer platform forwardly from its position in respect to the slow moving spaced conveyer elements to its position in respect to and past the rear ends of the fast moving spaced conveyer elements at a faster rate of speed than said fast moving spaced conveyer elements is then moving, said operating means also having means associated therewith for effecting the required positioning of said arms preparatory to, during and at the end of the transfer movement and for thereafter returning said arms along the lower paths therefor.

5. A conveyer mechanism comprising slow moving conveyer elements arranged for feeding material in a forward longitudinal direction, fast moving conveyer elements for feeding material in a forward longitudinal direction, a longitudinally movable transfer platform, means for raising said platform so as to lift said material from and above said slow moving conveyer elements, and means for moving said raised platform forwardly at a greater speed than that of the slow moving conveyer element so as to transfer said material in a longitudinal forward direction from the slow moving conveyer elements to said fast moving conveyer elements for spacing the material on the fast moving conveyer elements.

6. A conveyer mechanism comprising slow moving conveyer elements arranged to move material in a forward longitudinal direction, fast moving conveyer elements arranged to move material, a transfer platform, means for reciprocating said platform in a general longitudinal direction, said means including means for moving said platform in a rearward direction to a position beneath the top of the supporting surface of said slow moving conveyer elements and the material carried thereupon, means for raising said platform so as to lift said material from said slow moving conveyer elements, means for rapidly moving said raised platform in a forward direction to said fast moving conveyer element, and means for lowering said platform to discharge said material upon said fast moving conveyer elements and preparatory to said platform being returned in the rearward direction to its initial position in respect to said slow moving conveyer elements.

7. A conveyer mechanism comprising slow longitudinally moving conveyer elements and means comprising a spring and transfer elements for lifting material from said slow moving conveyer and for transferring in a forward longitudinal direction under the operating influence of said spring the lifted material to and upon said fast moving conveyer elements, said means also comprising mechanism for effecting a return of said platform to its initial position.

8. A conveying mechanism comprising a slow moving conveyer, a fast moving conveyer, and a transfer mechanism; said slow moving conveyer comprising transversely spaced conveyer elements for receiving and supporting material thereon and for imparting a slow forward longitudinal movement to the material thus supported; said fast moving conveyer comprising transversely-spaced conveyer elements for receiving and supporting material thereupon and for imparting a fast forward longitudinal movement to the material thus supported; the rear ends of the fast moving conveyer elements and the front ends of the slow moving conveyer elements being interpositioned and in overlapping arrangement; said transfer mechanism comprising transversely-spaced longitudinally-extending transfer elements initially positioned below the general supporting surface of said slow moving conveying elements and having mechanism for raising said transfer elements to position higher than said supporting surface and thereby effecting a lifting of material from said slow moving conveyer elements, for thereafter and while still raised moving said transfer elements in a forward longitudinal direction until the material thus lifted and transferred is positioned over said fast moving elements, for thereafter lowering said transfer elements whereby said material thus transferred is deposited upon the fast moving conveyer elements in a manner to be supported and conveyed by the latter and for ultimately and while still lowered moving said transfer elements in a rearward longitudinal direction back to the initial position therefor.

9. A conveying mechanism comprising a slow moving conveyer, a fast moving conveyer in substantial longitudinal alignment with the slow moving conveyer, and a transfer mechanism; said slow moving conveyer comprising transversely spaced conveyer elements for receiving and supporting material thereon while imparting a slow forward longitudinal movement to the material thus supported; said fast moving conveyer comprising transversely spaced conveyer elements for receiving and supporting material thereupon while imparting a fast forward longitudinal movement to the material thus supported; said transfer mechanism being constructed so that it comprises transversely-spaced longitudinally-extending transfer elements initially positioned below the general supporting surface of said slow moving conveying elements and having mechanism for raising said transfer elements to position higher than said supporting surface and thus effecting a lifting of material from said slow moving conveyer elements, for thereafter and while said transfer elements remain raised effecting a forward longitudinal movement thereof until the material thus lifted and transferred is over said fast moving elements, for thereafter lowering said transfer elements whereby said material thus transferred is deposited upon the fast moving conveyer elements for transfer by the latter and for ultimately and while still lowered effecting a return of said transfer elements to the initial position therefor.

10. A conveying mechanism as defined in and by claim 9, and in which the transfer mechanism comprises a transfer platform by and upon which there are mounted and carried transversely-spaced fingers that are serrated at the top portion thereof and which provide the transfer elements, a vertically movable platform support upon which said transfer platform is slidably mounted to permit longitudinal movement relative to the support, a transversely extending shaft by which there is operated a cam which serves during its movement to effect periodic lifting of said platform support from its initial position and by which shaft there is operated mechanism for imparting slow rearward longitudinal movement to said transfer platform at a time when said platform support occupies its lowermost position, and a spring means operatively connected to said transfer platform and which when allowed to do so imparts a quick forward longitudinal movement to said transfer platform; the construction and arrangement of the parts being such that upon said platform support being lifted to its uppermost position said spring functions to effect the quick forward longitudinal movement of the transfer platform, and also being such that following the completion of the forward longitudinal movement said cam permits a lowering of the platform support and which lowering is followed by the slow rearward longitudinal movement of the transfer platform to its initial position.

11. A conveying mechanism that includes in combination a slow moving conveyer that comprises a series of transversely spaced conveyer elements, a fast moving conveyer that comprises a series of transversely spaced conveyer elements, which conveyers are in substantial alignment with respect to each other, and a transfer mechanism comprising transversely-spaced longitudinally-extending fingers initially located between the conveyer elements of the slow moving conveyer, and means for moving said fingers so that the supporting surface thereof moves from below to a position above the supporting surface for the slow moving conveyer, for moving the fingers in a longitudinal direction—while elevated—to a forward position whereat material lifted from the slow moving conveyer by said fingers and conveyed by said fingers can be deposited ahead of the slow moving conveyer upon the fast moving conveyer, for lowering said fingers whereby the material thus conveyed can be deposited upon the fast moving conveyer and for returning said fingers longitudinally along the spaces provided between the fast moving conveyer elements into the space provided between the slow moving elements and to the initial position for said fingers.

12. In a conveyer mechanism as defined in and by claim 11 shaft driven members by which the vertical position of said fingers is controlled and by which a slow longitudinal return movement of the fingers when in lowermost position is realized, and spring means for effecting a quick forward longitudinal movement that takes place upon the fingers being elevated.

13. A receiving and delivering mechanism having a receiving conveyer and a delivering conveyer and characterized in that the receiving conveyer is slow moving and comprises a series of transversely spaced endless conveying elements and the delivering conveyer is fast moving and comprises a series of transversely spaced endless conveying elements, in that the forward ends of the receiving conveyer elements and the rear ends of the fast moving conveyer elements are interpositioned in overlapping arrangement and are carried on sprocket wheels or sheaves on a transversely extending shaft common to said conveyers, and in that it comprises longitudinally movable transfer elements, and means for operating said transfer elements so as to take material from the slow moving conveyer elements and convey the material to the fast moving conveyer elements whereby groups of material as assembled on the slow moving conveyer can be periodically taken therefrom and transferred to the fast moving conveyer.

14. A slicing machine as defined in and by claim 13, and in which the means for operating the transfer elements is constructed so as to effect a quick forward movement from the slow moving conveyer to the fast moving conveyer and so as to effect a slow return movement.

HARRY H. McKEE.
NICHOLAS DZIEDZIC.

CERTIFICATE OF CORRECTION.

Patent No. 1,976,855.  October 16, 1934.

HARRY H. McKEE, ET AL.

It is hereby certified that error appears in the printed specification of the above numbered patent requiring correction as follows: Page 4, line 21, claim 7, after "elements" insert the words fast longitudinally moving conveyer elements; and that the said Letters Patent should be read with this correction therein that the same may conform to the record of the case in the Patent Office.

Signed and sealed this 13th day of November, A. D. 1934.

Leslie Frazer
Acting Commissioner of Patents.

(Seal)

fingers longitudinally along the spaces provided between the fast moving conveyer elements into the space provided between the slow moving elements and to the initial position for said fingers.

12. In a conveyer mechanism as defined in and by claim 11 shaft driven members by which the vertical position of said fingers is controlled and by which a slow longitudinal return movement of the fingers when in lowermost position is realized, and spring means for effecting a quick forward longitudinal movement that takes place upon the fingers being elevated.

13. A receiving and delivering mechanism having a receiving conveyer and a delivering conveyer and characterized in that the receiving conveyer is slow moving and comprises a series of transversely spaced endless conveying elements and the delivering conveyer is fast moving and comprises a series of transversely spaced endless conveying elements, in that the forward ends of the receiving conveyer elements and the rear ends of the fast moving conveyer elements are interpositioned in overlapping arrangement and are carried on sprocket wheels or sheaves on a transversely extending shaft common to said conveyers, and in that it comprises longitudinally movable transfer elements, and means for operating said transfer elements so as to take material from the slow moving conveyer elements and convey the material to the fast moving conveyer elements whereby groups of material as assembled on the slow moving conveyer can be periodically taken therefrom and transferred to the fast moving conveyer.

14. A slicing machine as defined in and by claim 13, and in which the means for operating the transfer elements is constructed so as to effect a quick forward movement from the slow moving conveyer to the fast moving conveyer and so as to effect a slow return movement.

HARRY H. McKEE.
NICHOLAS DZIEDZIC.

CERTIFICATE OF CORRECTION.

Patent No. 1,976,855.    October 16, 1934.

HARRY H. McKEE, ET AL.

It is hereby certified that error appears in the printed specification of the above numbered patent requiring correction as follows: Page 4, line 21, claim 7, after "elements" insert the words fast longitudinally moving conveyer elements; and that the said Letters Patent should be read with this correction therein that the same may conform to the record of the case in the Patent Office.

Signed and sealed this 13th day of November, A. D. 1934.

Leslie Frazer
Acting Commissioner of Patents.

(Seal)